July 10, 1934.  T. H. DE SPAIN  1,966,377
LOOPER MACHINE
Filed Dec. 23, 1931  13 Sheets-Sheet 3

Inventor
Thomas H. DeSpain
By
His Attorneys

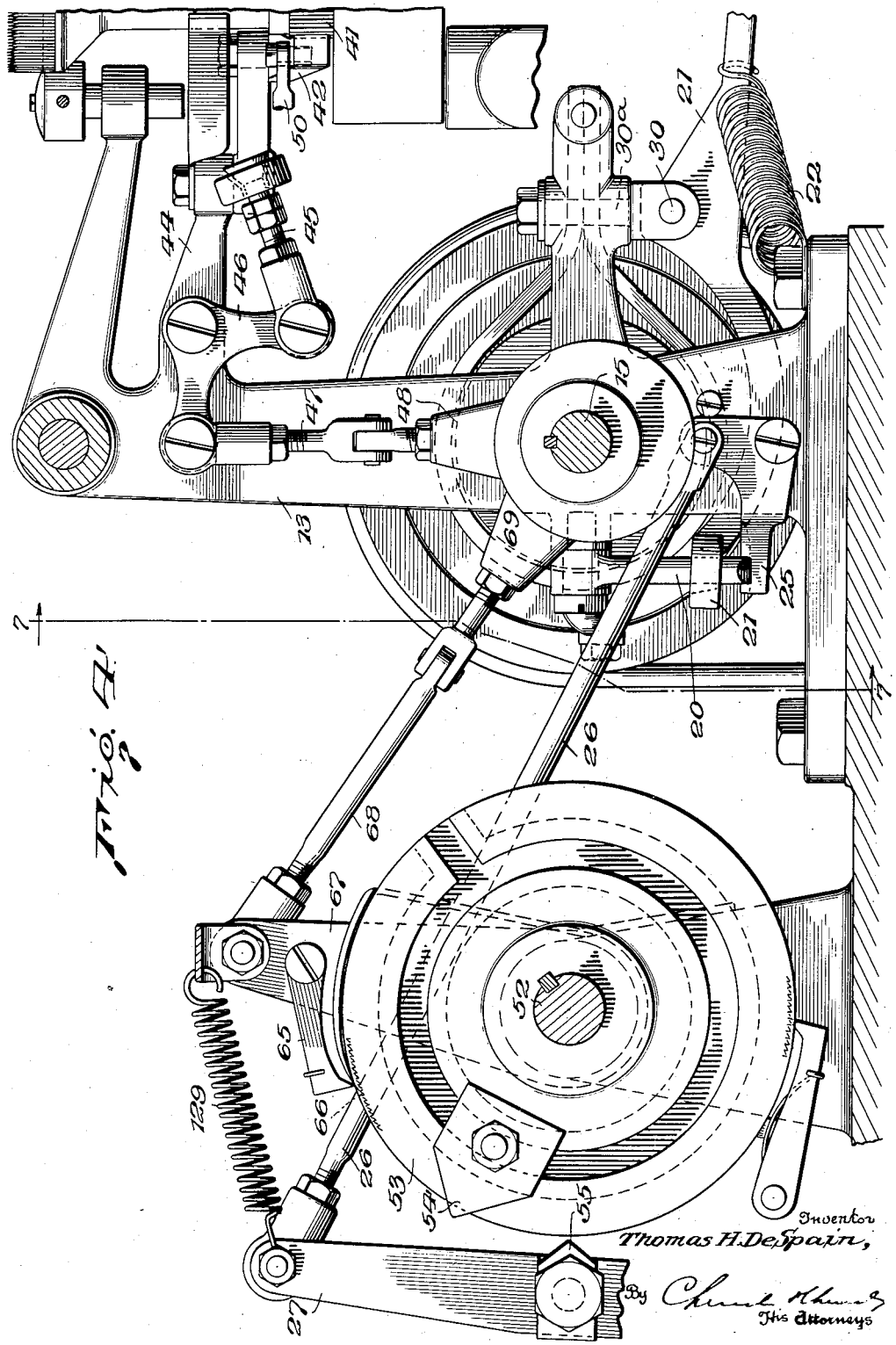

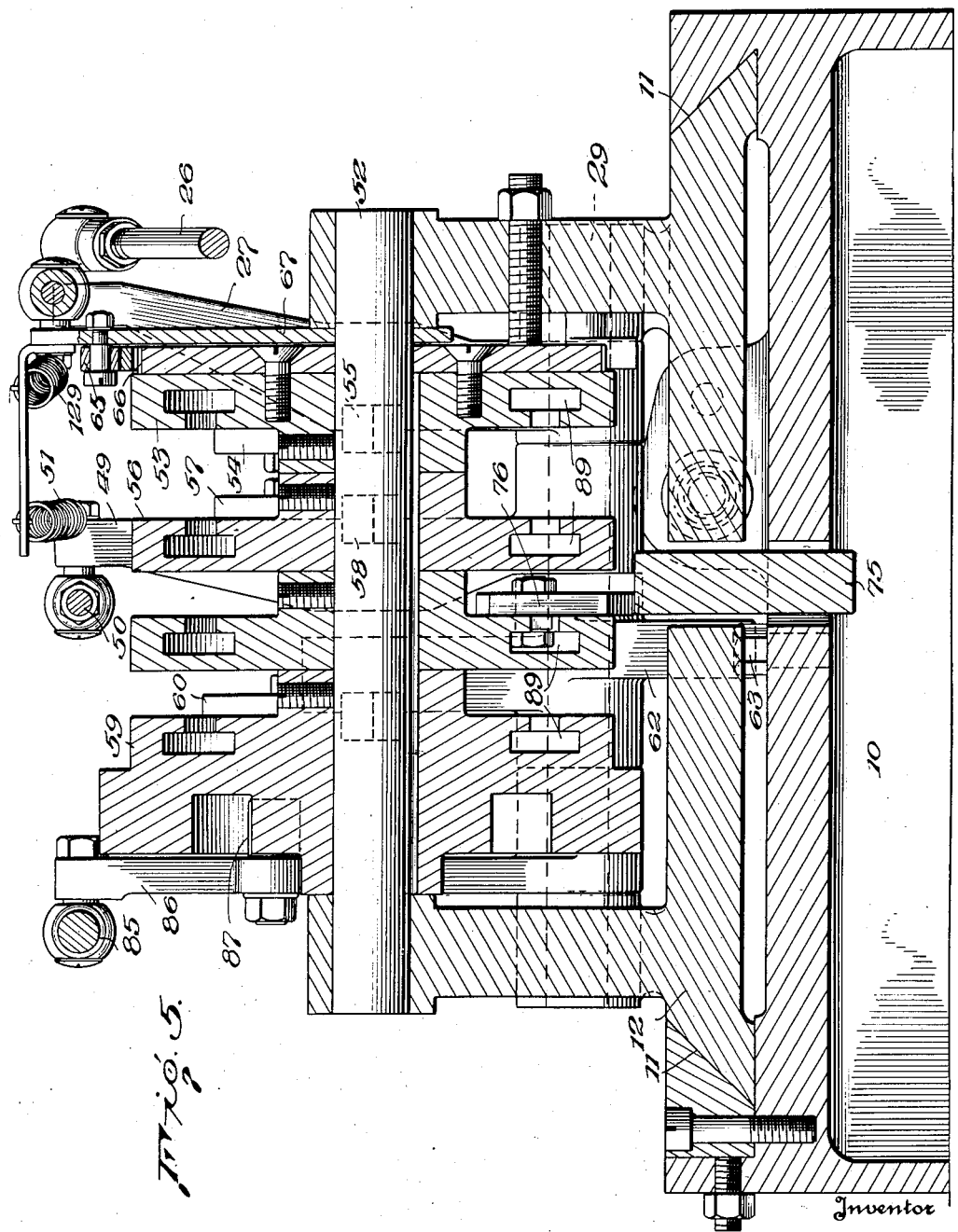

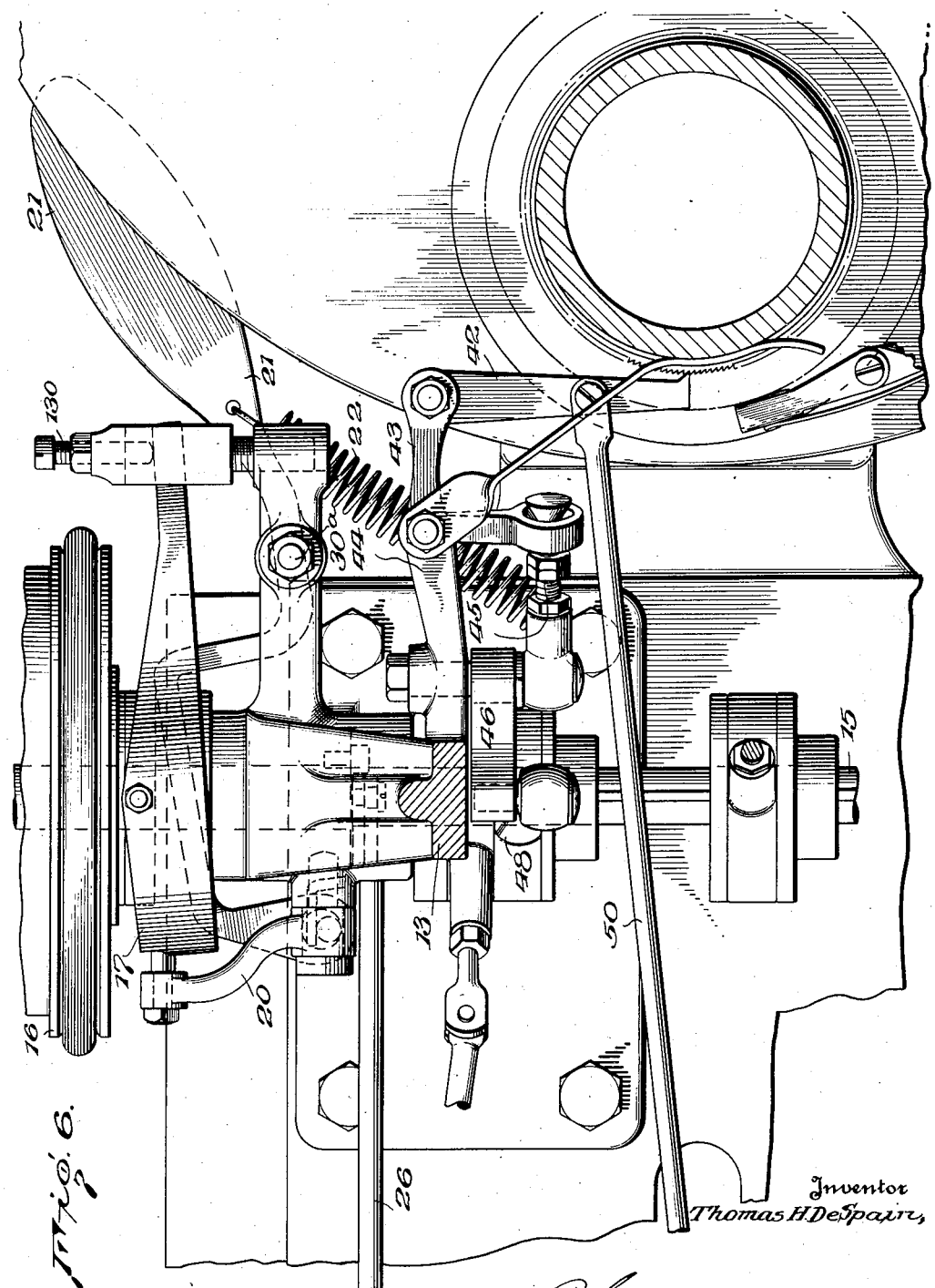

July 10, 1934.  T. H. DE SPAIN  1,966,377
LOOPER MACHINE
Filed Dec. 23, 1931  13 Sheets-Sheet 7
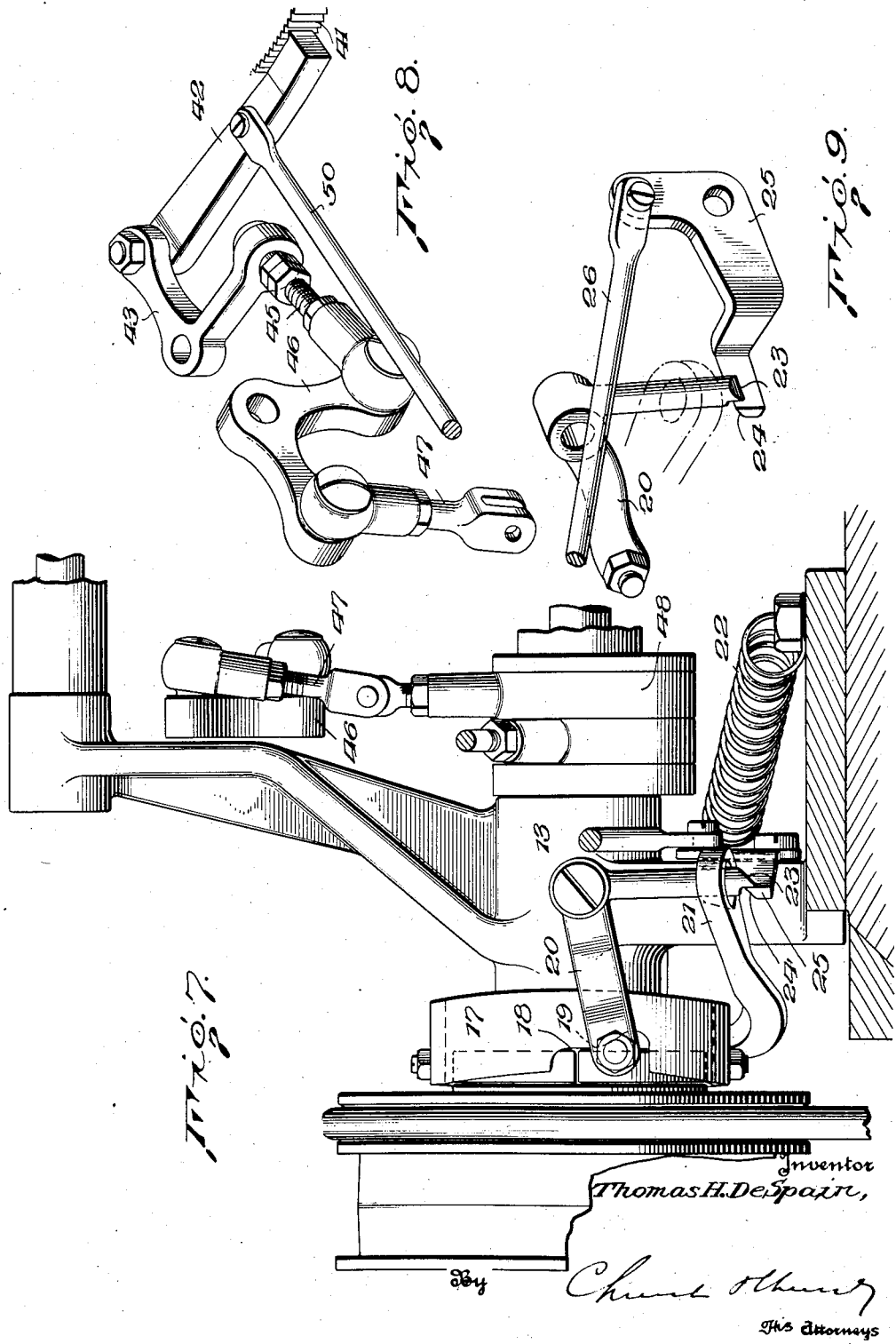
Inventor
Thomas H. De Spain,
By
His Attorneys

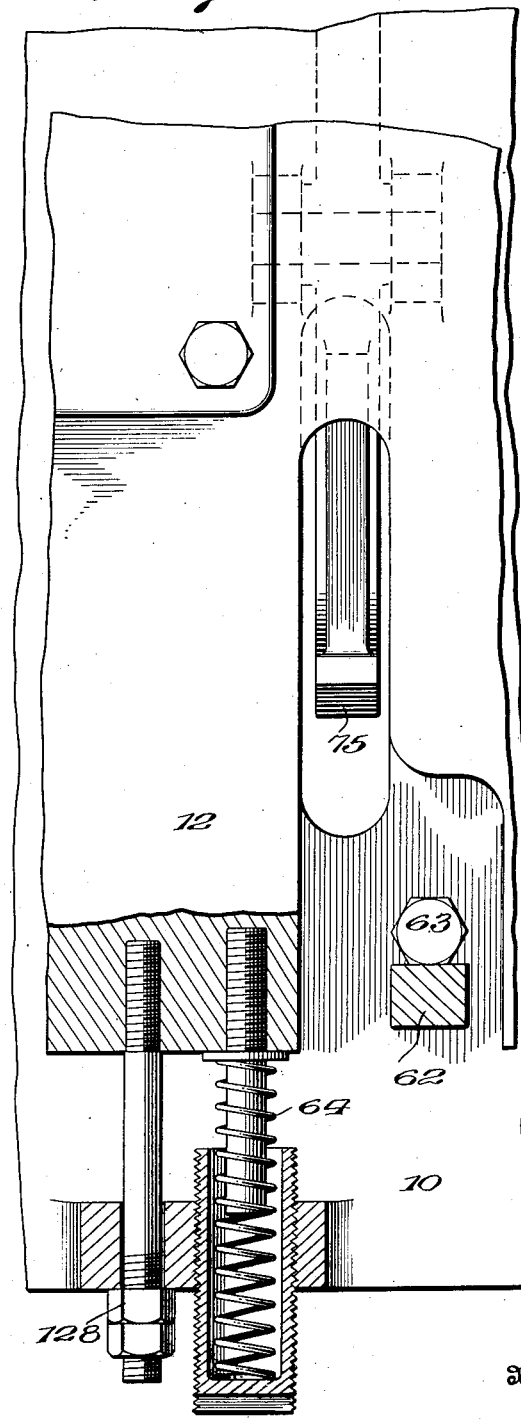
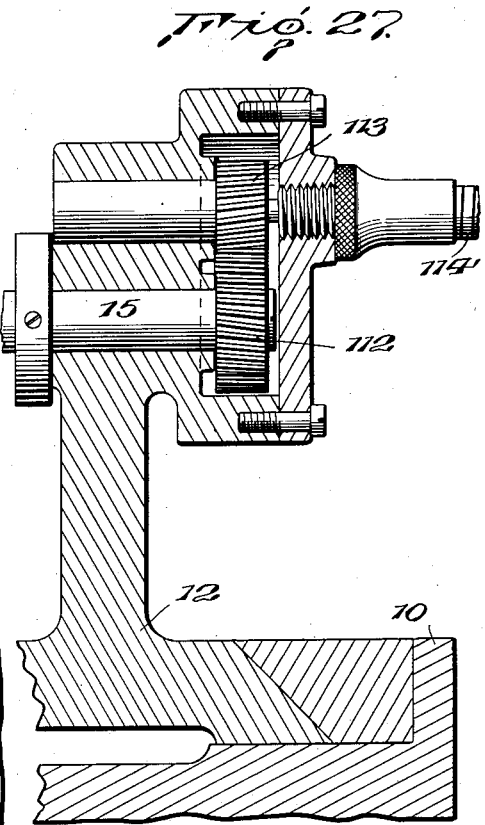
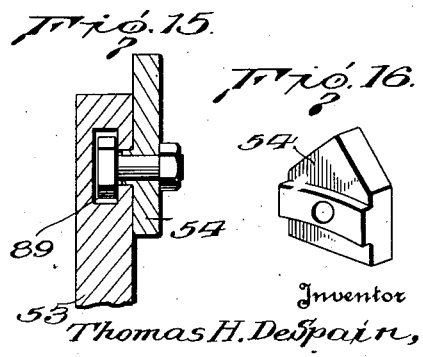

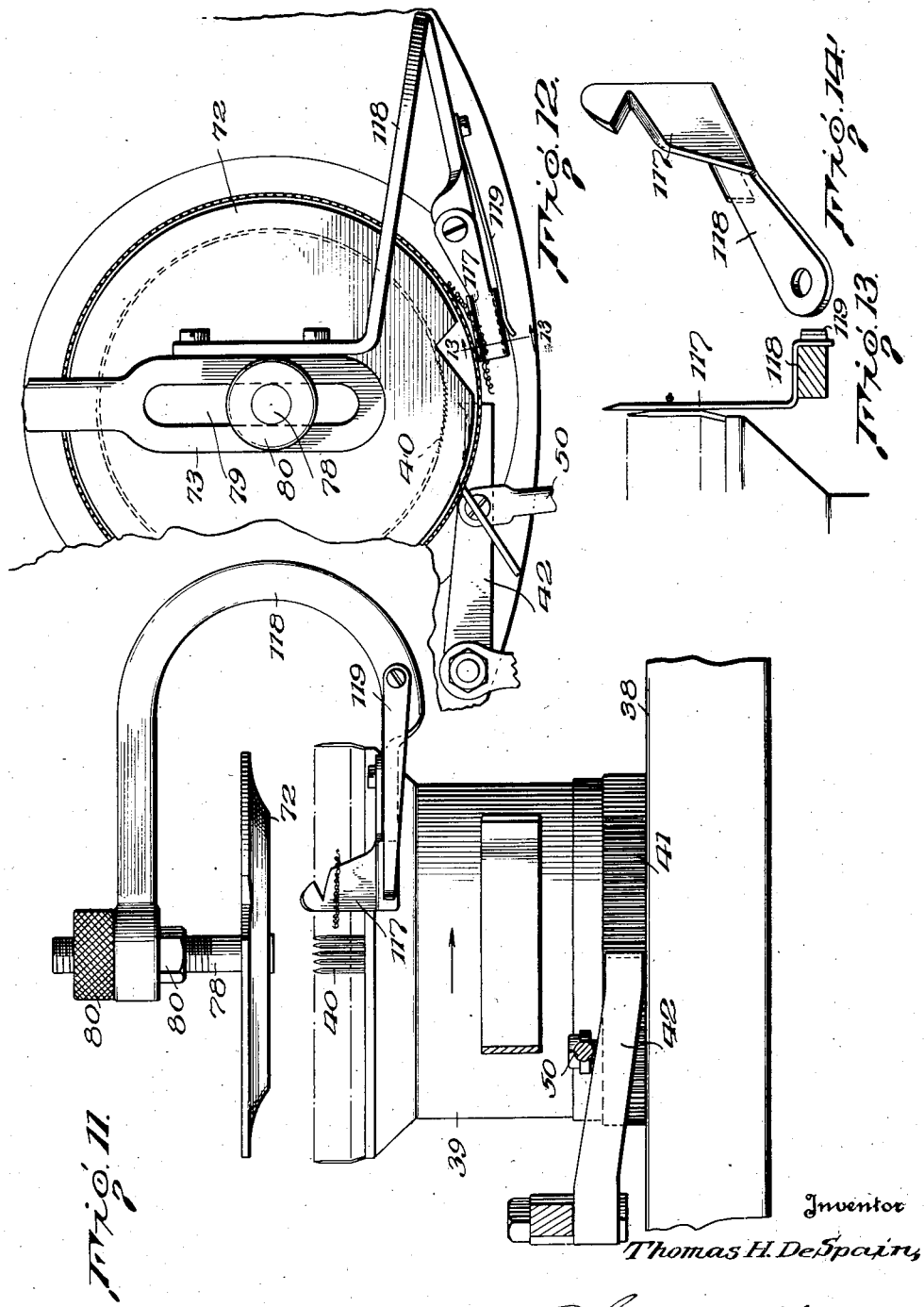

July 10, 1934.   T. H. DE SPAIN   1,966,377
LOOPER MACHINE
Filed Dec. 23, 1931   13 Sheets—Sheet 10
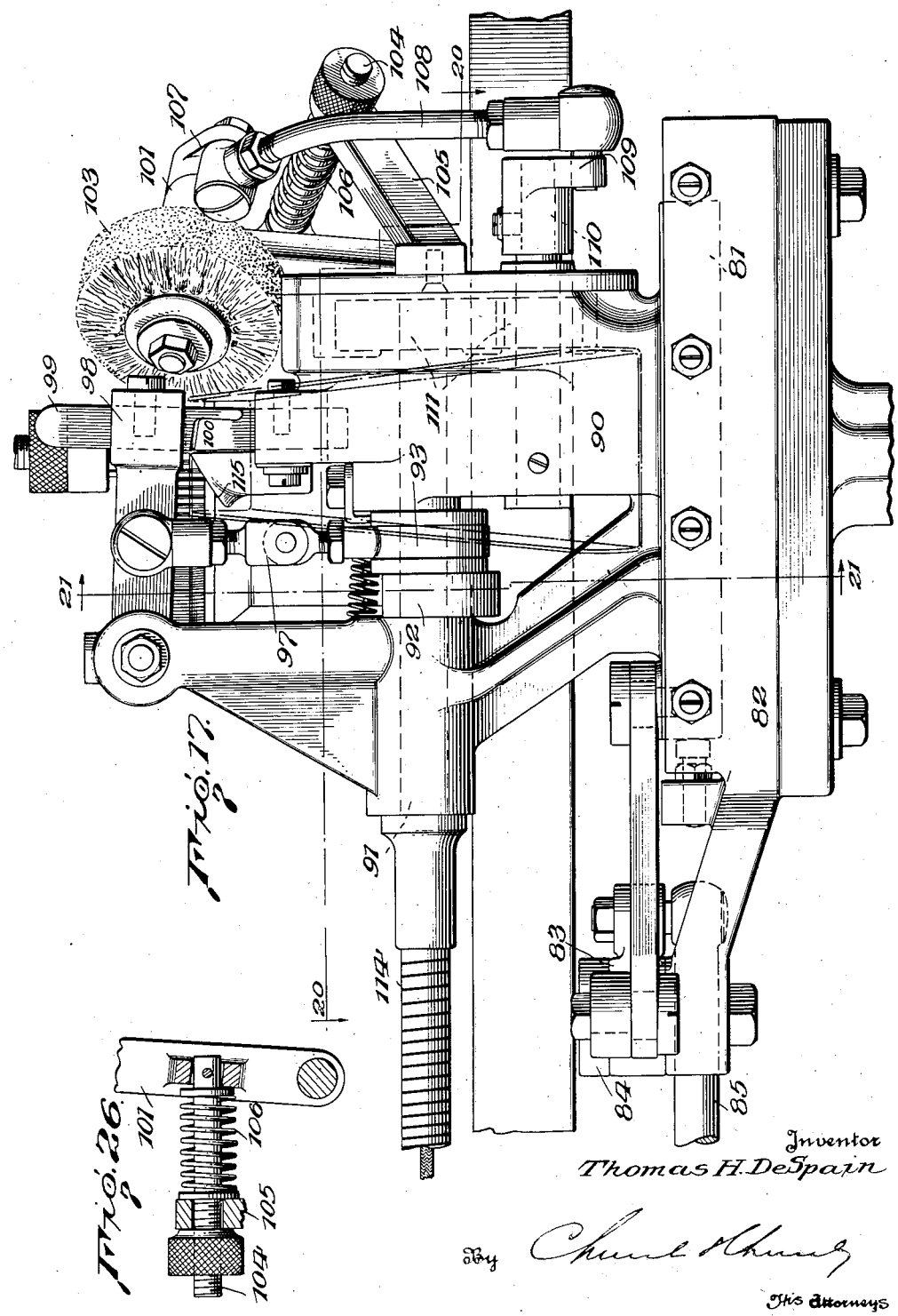
Inventor
Thomas H. DeSpain
By
His Attorneys

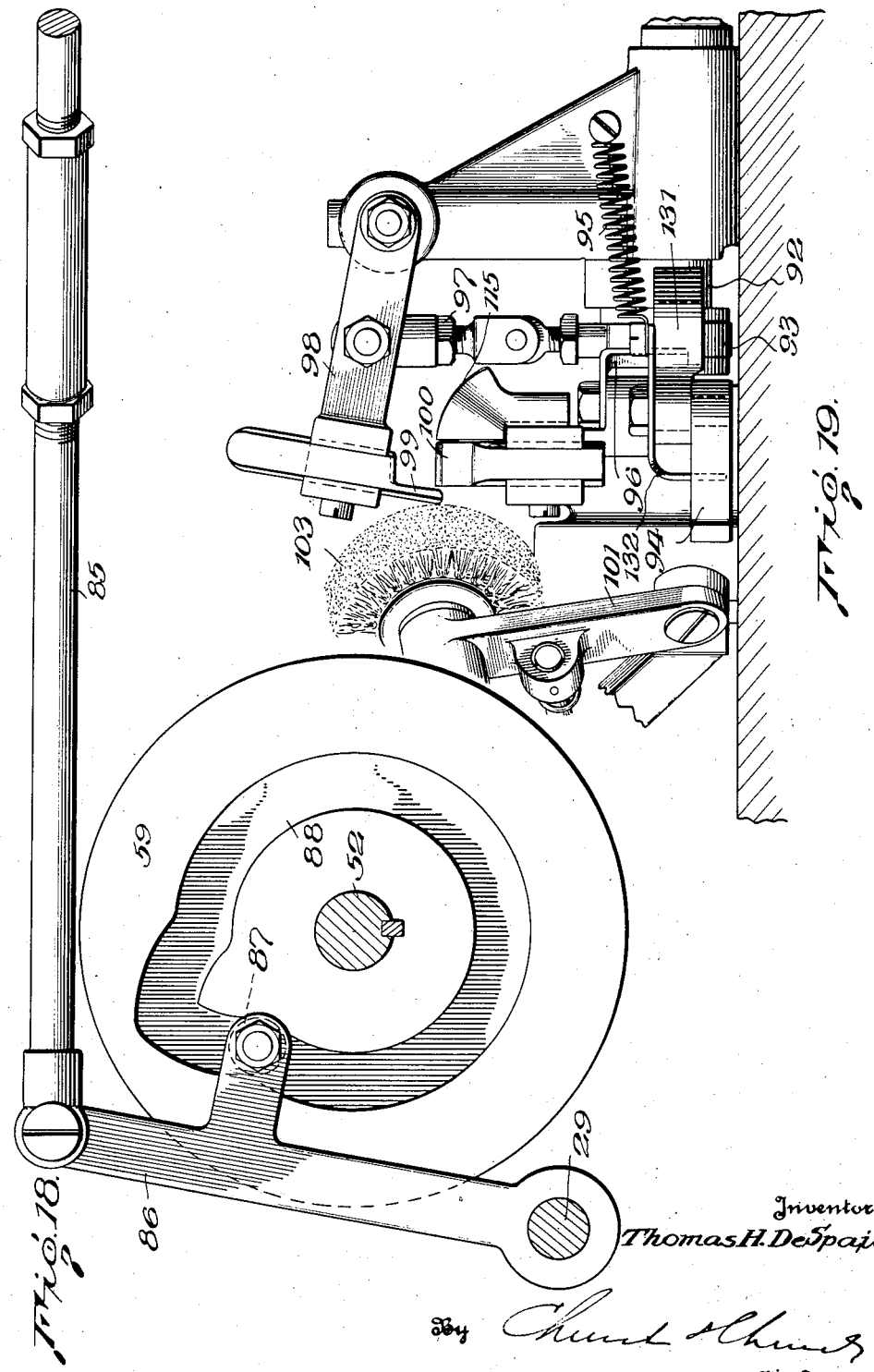

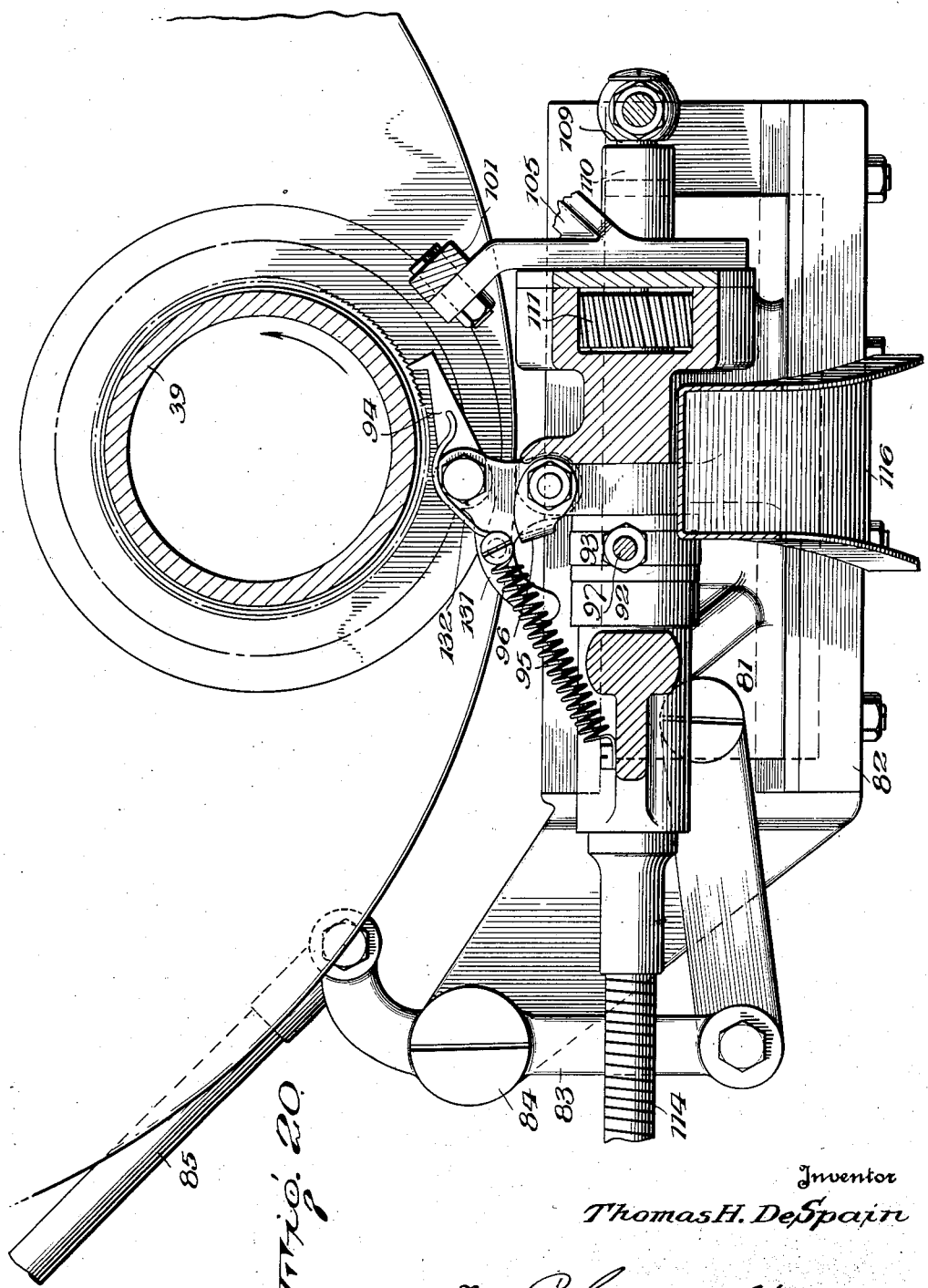

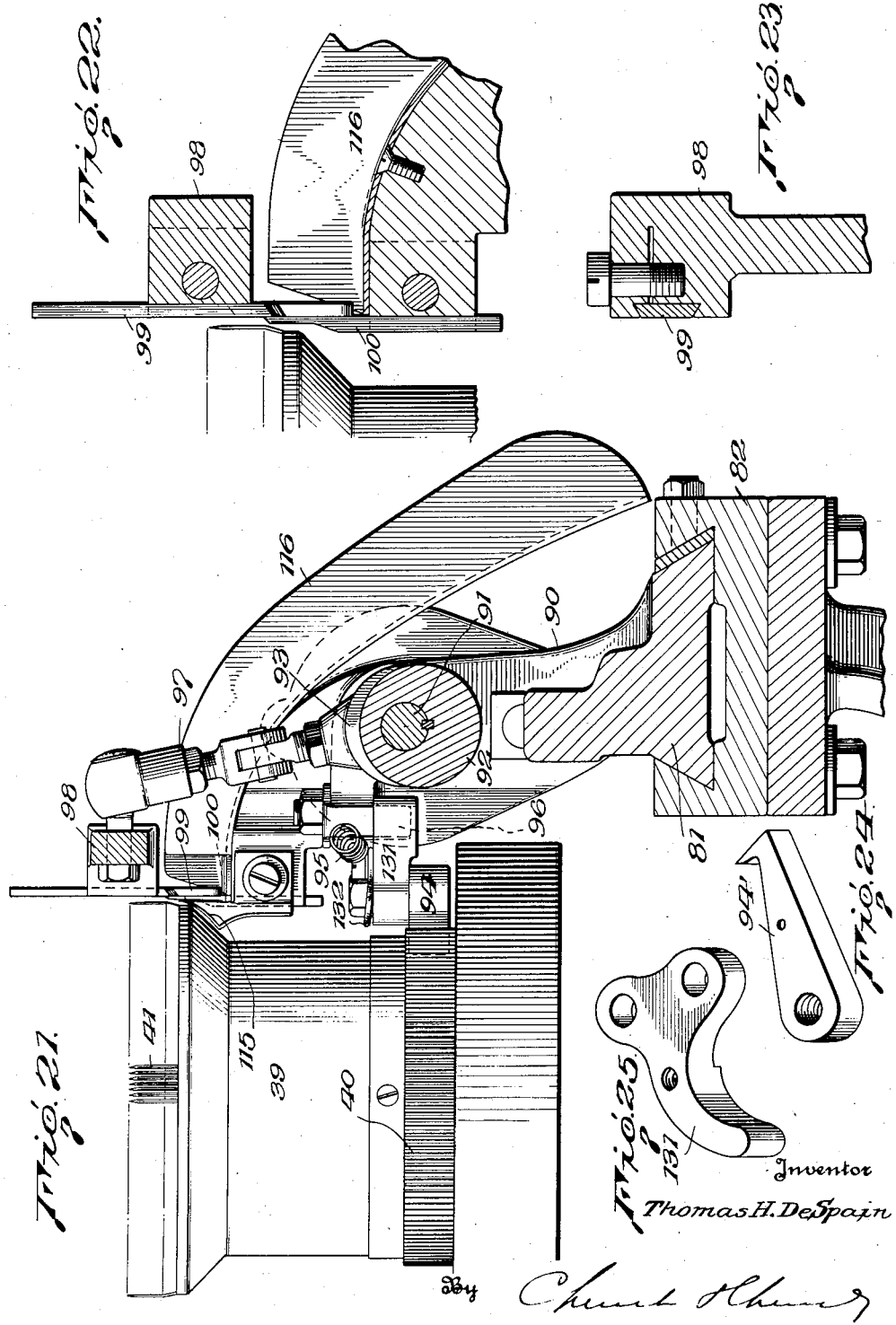

Patented July 10, 1934

1,966,377

UNITED STATES PATENT OFFICE 1,966,377

LOOPER MACHINE

Thomas H. De Spain, Paducah, Ky., assignor to Southern Textile Machinery Company, Paducah, Ky., a corporation of Kentucky Application December 23, 1931, Serial No. 582,859

13 Claims. (Cl. 112—25)

This invention relates to improvements in sewing machines.

In the manufacture of certain articles, for instance, men's hosiery, it is desirable to produce one portion of the hose, (the boot) in string formation on one machine and to produce the other portion of the hose, (the top) in string formation on a second machine in order that the production of these two parts of the hose might be speeded up. This method of production requires the use of a third machine for uniting the boot and the top of a stocking and it is such a machine, usually termed a cylinder looper, to which the present invention is especially applicable although various features of the present invention may, no doubt, be utilized in other types of machines.

One object of the present invention is to provide a cylinder looper wherein the sewing mechanism is movable toward and away from the work holder, with automatic means for moving the sewing mechanism away from the work holder at predetermined times.

A further object is to provide a stop mechanism that will permit the sewing mechanism to not only form a complete seam around the boot and stocking top but will also, in combination with the movable sewing mechanism, function to permit the sewing mechanism to form several overlapping stitches in the seam and additional stitches after the sewing mechanism has been moved away from the work whereby a series of stitches, which will be referred to as chaining-off stitches, are formed.

A still further object is the provision of a cutter so positioned with respect to the work holder that as the work is removed from proximity to the sewing mechanism the cutter will sever the chaining-off stitches. This provision of the chaining-off stitches, in combination with the automatic cutter, results in the presence of the thread through the various thread guides and sewing needle at all times or, in other words, it is not necessary to rethread the sewing mechanism each time a stocking is produced on the machine.

Another object is to increase the production of the present machine by providing a movable work support, or turret, in which a series of work holders are carried and brought successively into position for the materials thereon to be trimmed and then into position for the seweing operation. Preferably, the work support is rotatable and the work holders consisting of cylinders, are rotatably and removably mounted in the work support so that while one cylinder is in trimming position and another is in sewing position, the operator may be placing the boot and top of another stocking on a third cylinder and may place it in its mounting on the support while the machine is in operation.

Another object is the provision of a simple and extremely efficient trimmer mechanism for closely trimming off the selvedge or grasping edges of the boot and stocking top prior to uniting the top and boot proper by the sewing mechanism. This trimmer is so mounted with respect to the work support that it will trim the work on one work holder in the series of work holders carried by the work support while the work on a second cylinder in said series is in sewing position and while the operator is placing new work on a third holder to be placed in said series.

Another object of the invention is the provision of means for removing the selvedge bands of fabric that are provided for the purpose of assisting the operator in impaling the woven portions of the article to be united upon the impaling pins of the work cylinder.

A still further object is the provision of adjustable means for rotating the work cylinders when in trimming position or in sewing position.

Another object is the provision of a plurality of stitch plates for holding the stitches of the boot and stocking top on the impaling pins or points of the work holders or cylinders. These stitch plates are adapted to be positioned on the stitches impaled upon the cylinder points when the cylinders are in trimming position and in sewing position and they are also adjustable with respect to the cylinders in order to accommodate cylinders of different heights. Preferably, the cylinders are rotatably mounted in a turret or rotatable work support and the stitch plates are adjustable radially and axially with respect to the said support.

The trimmer mechanism includes a brush for clearing away the trimmed selvedge portions of the boot and top after they have served their purpose of grasps for assisting the operator in accurately impaling the correct row of stitches upon the pins of the work cylinder. Another object of the invention is, therefore, to operate the trimmer at a speed in excess of the speed of the sewing mechanism whereby the selvedge will be removed by the brush throughout the entire circumference of the finished stocking. In other words, instead of the stocking, in trimming position, making only one complete revolution, under which circumstances particles of selvedge will remain on the stocking over a distance equal to the distance between the trimmer proper and the brush, the work holder, when in trimming position, is caused to make more than a complete revolution in order to insure the trimmer and its associated brush coming into engagement with the entire circumference of the stocking.

Another object is the provision of mechanism for automatically removing the stitch plates from association with the work holders when the operation upon one piece of work has been completed.

Another object is the provision of mechanism automatically moving the trimmer mechanism relative to the adjacent work holders upon completion of the trimming operation.

Another object is the provision of mechanism for automatically moving the sewing mechanism away from the work holder upon completion of the stitching operation and means for automatically disengaging the clutch which controls the operation of the main drive shaft.

The automatic mechanism for effecting relative movement of the trimmer, sewing mechanism, stitch plate and for actuating the clutch comprises a plurality of trips associated with a main cam mechanism on the timing shaft of the machine and these several trips are each adjustable with respect to the main cam whereby the timing of the operation of the various elements may be readily varied.

With these and other objects in view, the invention consists in certain details of construction and combinations and arrangements of parts, all as will hereinafter be more fully described and the novel features thereof particularly pointed out in the appended claims.

In the accompanying drawings:

Fig. 4 is an enlarged vertical sectional view on the line 4—4 of Fig. 1;

Fig. 5 is a transverse sectional view on the line 5—5 of Fig. 1, illustrating the timing shaft and associated cams and trips;

Fig. 6 is a horizontal sectional view on the line 6—6 of Fig. 2;

Fig. 7 is a vertical sectional view on the line 7—7 of Fig. 4;

Fig. 8 is a perspective view of the operating connections between the drive shaft and sewing mechanism feed dog;

Fig. 9 is a perspective view of the operating connections for the clutch which controls the operation of the main drive shaft;

Fig. 10 is a horizontal detail sectional view on the line 10—10 of Fig. 2;

Fig. 11 is a detail elevational view of a work cylinder in sewing position, illustrating the sewing mechanism feed dog, chain-stitch cutter, and the stitch plate associated therewith, the stitch plate being shown in its elevated position which it occupies to permit movement of the work cylinder support;

Fig. 12 is a plan view of the mechanism shown in Fig. 11;

Fig. 13 is a detail sectional view on the line 13—13 of Fig. 12;

Fig. 14 is a perspective view of the thread cutter;

Fig. 15 is a detail sectional view through one of the disks on the timing shaft illustrating the adjustable mounting of one of the trips;

Fig. 16 is a perspective view of one of said trips;

Fig. 17 is an elevational view of the trimmer mechanism looking radially inward with respect to the work cylinder support;

Fig. 18 is a detail view of the cam on the timing shaft for moving the trimmer mechanism relatively to the work holders;

Fig. 19 is an elevational view of the trimmer mechanism looking radially outwardly with respect to the work cylinder support;

Fig. 20 is a horizontal sectional view on the line 20—20 of Fig. 17;

Fig. 21 is a vertical sectional view on the line 21—21 of Fig. 17;

Fig. 22 is an enlarged sectional view of the cutting knives of the trimmer mechanism;

Fig. 23 is a detail view illustrating the mounting of one of the trimmer knives;

Fig. 24 is a detail perspective view of the feed dog for the trimmer mechanism;

Fig. 25 is a similar view of the feed dog operating trip;

Fig. 26 is a detail sectional view of the tensioning mechanism for the trimmer mechanism brush;

Fig. 27 is a sectional view on the line 27—27 of Fig. 1.

Figure 1:
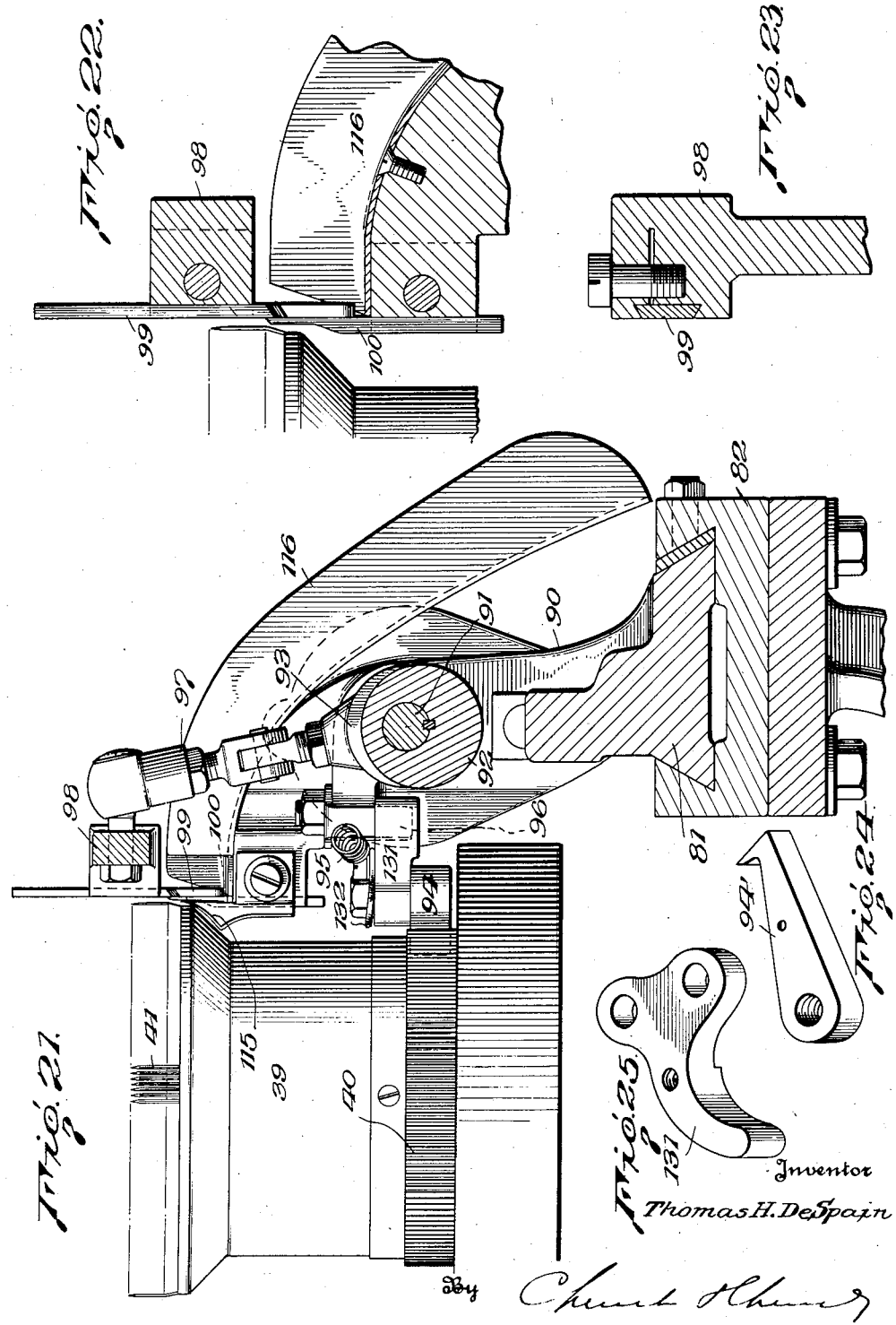
Figure 1 is a top plan view of the preferred embodiment of the present invention.
Figure 2:
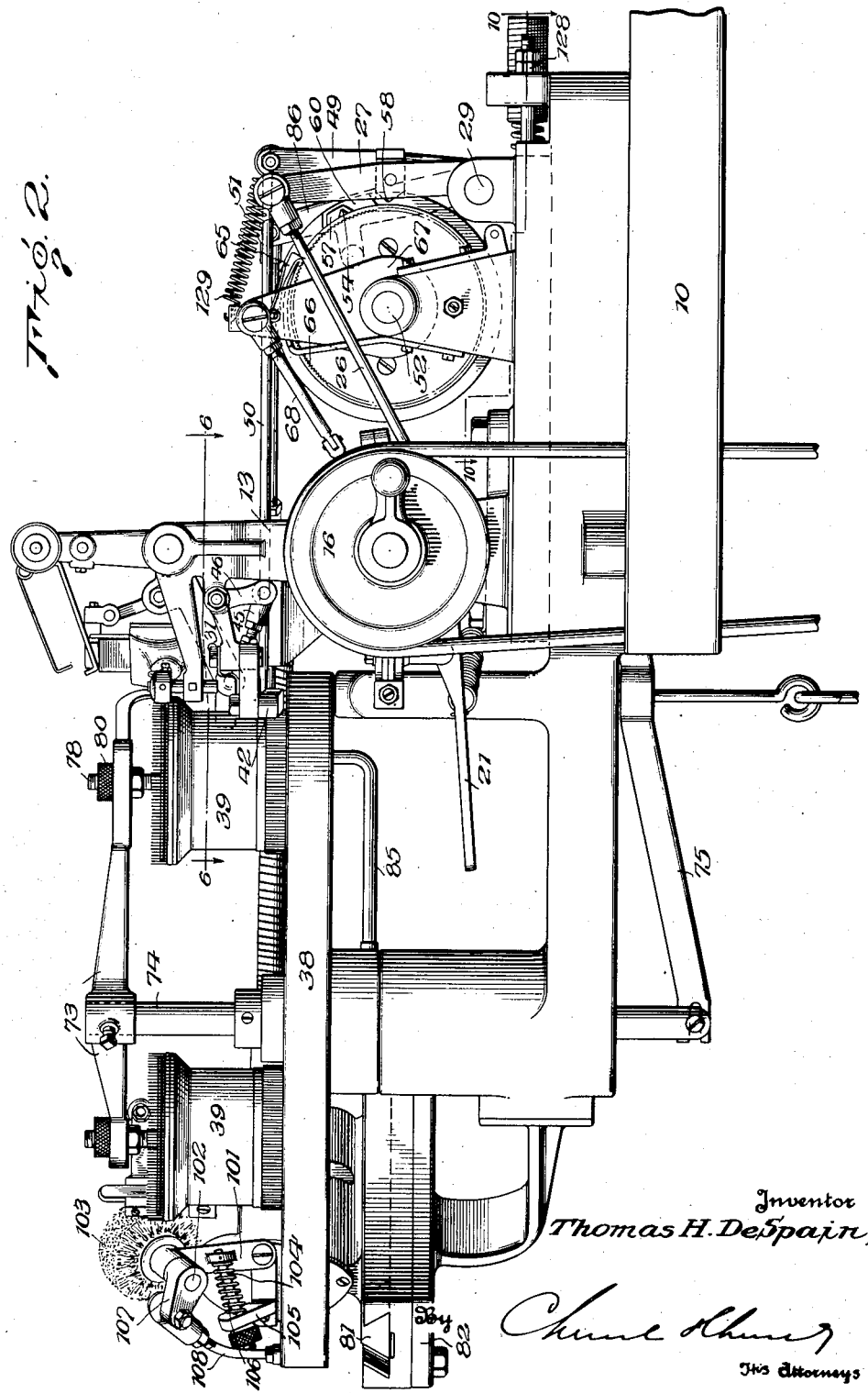
Fig. 2 is a side elevation.
Figure 3:
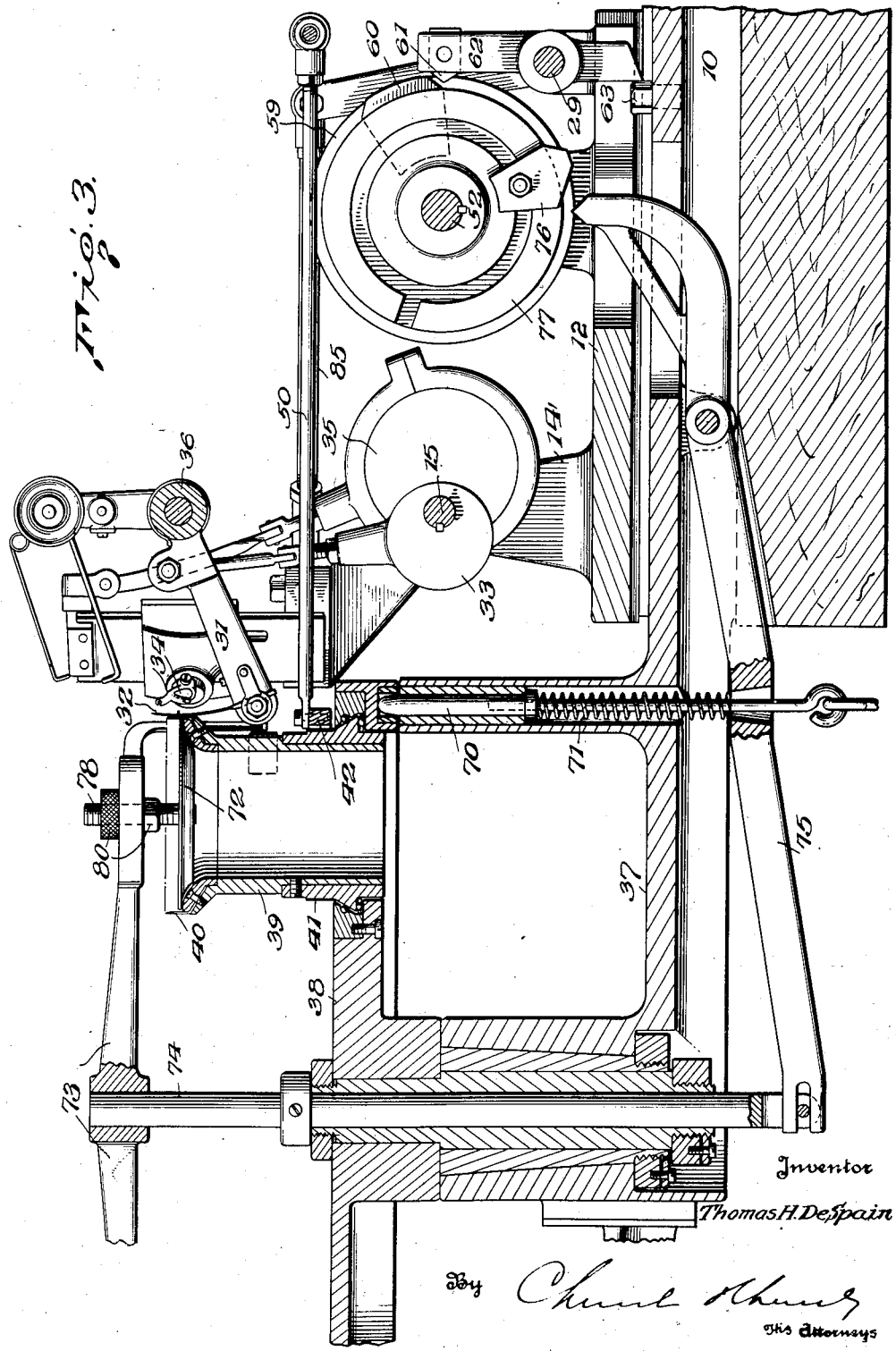
Fig. 3 is a vertical section on the line 3—3 of Fig. 1.

Generally, the present machine comprises essentially a trimming mechanism, a sewing mechanism and a work support carrying a series of work holders, the support being movable and the holders being positioned thereon so that when one holder is at the "sewing station" or a position where the work carried thereby is operatively associated with the sewing mechanism, another holder will be at the "trimming station", or a position where the work carried by it will be operatively associated with the trimmer mechanism. At the same time, a third holder of the series will be free to have finished work removed therefrom and new work placed thereon.

Preferably, the work holders are in the usual form of cylinders having a circular series of impaling pins or points on which the work is placed. The holders are removably and rotatably journaled in the movable support, being provided with external gear teeth which are engaged by a feed dog when in sewing or trimming position for rotating the holder. The work on the holders is also held down on the impaling pins or points by hold-down plates or disks. In connection with these various elements, there are means for automatically actuating the several parts whereby the trimmer mechanism is removed from operative association with the work support when the pieces of work to be joined have been completely trimmed; the sewing mechanism is moved out of operative association with the work support; the hold-down plates are removed from the work holders; and the feed dog of the sewing mechanism is removed from engagement with the gear on the work holder in sewing position and the main drive shaft of the machine rendered inoperative. At this time, the work support is free to be moved by the operator to advance a newly mounted piece of work to trimming position; transfer the last trimmed work from trimming position to sewing position; and move the last sewn piece of work from the sewing mechanism to a point where the finished piece of work can be removed from the holder and new work substituted. These movements of the several parts are controlled by means of timing elements on a timing shaft operatively connected to the main drive shaft but the operation of the drive shaft is so related to the operation of the timing shaft, that the work holders in sewing and trimming position will make more than a complete revolution before the sewing mechanism and trimmer mechanism are rendered inoperative. This arrangement is provided in order that the sewing mechanism will have time to lap the ends of the seam and, in addition, form a plurality of "chaining-off" stitches by which the thread can be severed and still leave the thread needle of the sewing mechanism threaded, and also in order that complete trimming of the selvedge or grasping portions of the several fabric pieces to be united will be accomplished before the work is passed to the stitching mechanism.

In a preferred embodiment, the machine is formed with a base 10, in which ways 11 are provided for what will be called a reciprocatory table 12 carrying sewing mechanism and the major portion of the driving connections therefor. As illustrated, this slidable table 12 has a plurality of standards 13, 14 in which bearings are provided for the main drive shaft 15 to which power is supplied from a suitable source through a driving connection associated with a pulley 16 on the drive shaft. Movement of plate 12 toward the work turret is limited by a stop 128. The pulley is adapted to be clutched to the shaft by a clutch of the usual type wherein the clutch elements are held in engagement by springs, but said members are adapted to be normally held disengaged in the present instance by mechanism comprising a shiftable member 17, whereby the pulley is free to idle. This shiftable member, which is adjustable by a screw 130, is formed with a cam surface 18, engaged by a cam member 19 on one arm of a bell crank lever 20 pivoted on one of the plate standards 13. The other arm of said bell crank lever 20 is loosely engaged by an operating lever 21 pivoted for vertical movement at 30 and for horizontal movement at 30a, Fig. 4. Operating lever 21 is yieldingly held by a spring in a position wherein the bell crank lever 20, through cam 19, will shift member 17 to disengage the clutch elements and permit the pulley to idle. As will hereinafter be explained, the sewing mechanism is adapted to be automatically rendered inoperative after the sewing of each piece of work is completed. For this reason, one arm of the bell crank lever 20, carrying the clutch engaging cam is provided with a beveled surface 23 adapted to ride on a beveled surface 24 on a latch lever 25. This latch lever is in the form of a bell crank lever pivoted on the plate standard. Attached thereto is a connecting rod 26 which is also attached to a lever 27 pivoted on a shaft 29 mounted on the sliding plate. This lever has attached to its upper extremity a spring 129 which is also attached to a fixed part of the machine, the tension of said spring being such that the bell crank lever latch 25 is normally held in position to engage the beveled arm 23 of the clutch operating bell crank lever 20, when the latter is moved by the operating handle to render the clutch operative. In other words, when the operating lever handle is moved to render the clutch operative, the arm of the bell crank lever 20 rides over the bevel surface 24 and depresses the latch lever and when it has cleared the latter is retained in clutching position. As will be later described, the latching lever is automatically actuated to release the clutch upon completion of the sewing operation on any given piece of work. However, if the operator desires to render the machine inoperative, he may do so by reason of the fact that the ball and socket pivot for the operating lever not only permits a lateral or horizontal movement of said lever for rendering the clutch operative but it also permits its operative end to be depressed to depress the latch lever 25, under which circumstances the clutch bell crank lever 20 will be released.

Carried on the main operating shaft 15 are a series of cam elements for operating the various instruments involved in the sewing operation. As the sewing mechanism may take any of various forms and is not essentially a part of the present invention, it may be described generally by saying that the needle arm 31, carrying the thread needle 32, is actuated by the cam 33 of the main operating shaft and the looper 34 is operated through suitable connections from the cam 35 on the operating shaft. The needle arm is pivoted in an overhanging arm 36 projecting from the upper extremity of the plate standard 14.

In the present invention each piece of work is adapted to be placed on what is commonly known as the work cylinder and to increase production, a plurality or series of these work cylinders are provided in the present machine, the individual cylinders being periodically and successively positioned at different stations for association with the sewing and trimming mechanisms. Preferably, the base of the machine is provided with an extension 37 on which is rotatably mounted a turret 38. Said turret has formed therein bearings in which three work holders 39 may be rotatably and removably secured. In this way, one work holder, having work thereon, may be positioned in sewing position, indicated at "A" in Fig. 1, the second work holder upon the pins of which the work has previously been impaled and sewed can occupy a position "B", which will be called trimming position, while a third work cylinder is in a position "C" where previously finished work may be removed therefrom and a new piece of work placed thereon. Each work cylinder carries at its upper extremity the pins or points 40, on which the stitches of the goods to be united are placed, the goods depending from the points or pins downwardly into the interior of the cylinder. On the exterior of the cylinder and at a point where they will be positioned just above the upper surface of the revoluble turret is a series of teeth 41 arranged circumferentially of the periphery of the cylinder. These teeth are provided in order that the cylinders may be rotated when in sewing position to permit the needle to be moved into and out of the work on each impaling pin or point. These teeth on the exterior of the work cylinder also permit this cylinder to be rotated for the purpose of the work being trimmed when the cylinder is in trimming position.

To rotate the cylinder in sewing position there is a feed dog 42 (Figs. 6 to 8) on the bell crank lever 43 which, in turn, is pivoted on an arm 44, projecting from the standard 13 on the slidable plate. This bell crank lever is attached by an adjustable connecting rod 45 to a second bell crank lever 46 pivoted on said extension and which, in turn, is attached by an adjustable rod 47 to a camming member 48 on the main driving shaft 15. Said connecting rod 45 projects through a substantially collar-like portion of lever 43, the end of said rod terminating in a conical portion which abuts against one side of said collar portion (Fig. 8) and moves said lever in one direction. Threaded on said rod 45 is a nut which forms an abutment engaging against the opposite side of said collar-like portion of lever 43 for moving said lever in the opposite direction and by adjusting said nut with respect to lever 43 and varying the length of said rod, the throw imparted to lever 43 can be varied at will. With these connections each revolution of the drive shaft will actuate the dog to rotate the work cylinder one tooth or the equivalent of one pin. For purposes which will later appear, the feed dog 42 also has attached thereto a connecting rod 50, which extends to lever 49 pivoted on shaft 29. A spring 51, attached to the free end of the lever 49, urges the connecting rod and feed dog toward the work support so that the feed dog is normally yieldingly held in position to engage the teeth 41 on a work cylinder in sewing position.

As before pointed out, the boot and top of the stocking are united by the sewing operation but the operation of the sewing mechanism is so timed that it will make a desired number of stitches over and above a complete seam around the stocking to overlap the ends of the seam. It is also so timed and manipulated that the thread needle will be disengaged from the work after the overlapping stitches are formed therein, but will continue to make additional stitches to one side of the work. These stitches are termed "chaining-off" stitches and it is these chaining-off stitches that are severed by the knife 117 when each piece of work is completed and the work support is rotated clockwise to bring the next cylinder into sewing position. By thus severing the thread at a point in advance of the thread needle, the machine is always threaded up. To carry out these operations, there is mounted on the sliding plate a timer shaft 52 (Figs. 1 to 5). This shaft carries a series of trips for actuating the various instrumentalities. For instance, there is a disk carrying a trip member 54, adapted to engage an abutment 55 on the lever 27 to depress the clutch latch. A second disk 56 carries a trip 57 that engages an abutment 58 on the lever 49, which is connected to the feed dog by rod 50. A third disk 59, carries a trip 60 that engages an abutment 61 on a rocker lever 62 mounted on the shaft 29 said rocker lever being adapted to engage an abutment 63 on the base whereby movement of the plate away from the work holder turret will be effected. Normally, a spring 64 yieldingly holds the plate forward or toward the turret in a position where the thread needle of the sewing mechanism will engage stitches on the pins or points of a work cylinder in sewing position. The timer shaft 52 carrying the several trip disks is rotated by means of a feed dog 65 spring pressed into engagement with a gear wheel 66 on said shaft. This dog is pivoted on a lever 67 on said shaft 52 and said lever 67 is connected by rod 68 to a cam member 69 (Fig. 4) on the main drive shaft 15, whereby oscillation of the lever will impart a step by step rotary movement to the timer shaft. The gear 66 has a number of teeth thereon corresponding to the number of impaling pins or points on the work cylinder plus the number of stitches to be made in the work to form an overlap at the ends of the seam and plus the number of stitches to be made in the chaining-off stitches. In this way, when the machine is placed in operation on a piece of work the sewing mechanism will be operatively associated with the work up to a predetermined time, as until the seam, overlapped at its ends, is completed. At this time, the trip 60 on the trip disk 59 will engage the rocker lever 62 and oscillate the same with the result that the sewing mechanism will be retracted or pushed away from the work turret, or work cylinder. The sewing mechanism will continue the formation of stitches, however, due to the fact that the clutch has not been disengaged and due to the fact that the feed dog is held in engagement with the teeth on the work cylinder by the connecting rod 50. When the desired number of chaining-off stitches have been made, the trip 54 on trip disk 53 will engage the lever 27 and by rocking said lever will depress the clutch latch lever 25. The spring tension on operating lever 21 will then cause bell crank lever 20 (Fig. 7) to rock and disengage the clutch. The sewing mechanism will cease to operate. At substantially the same time the trip 57 on trip disk 56 will engage lever 49 and through rod 50 rock the feed dog on its pivotal center to disengage it from the teeth on the work cylinder. The work cylinder turret will then be free, so far as the sewing mechanism is concerned to be revolved, one-third of a revolution in a clockwise direction to permit removal of the previously sewn and trimmed work from the work cylinder and the impaling of new work thereon at station A; to transfer the previously sewn work to the trimmer mechanism or station C; and to move a cylinder with new work to the sewing mechanism.

The work cylinder turret or support 38 is revolved manually from station to station. It is held in proper working position at the several stations by a pin or plunger 70 (Fig. 3) slidable in the turret support extension 37 and yieldingly urged by a spring 71 into one of a number of recesses in the undersurface of the turret. One of these recesses is in registry with said pin or plunger whenever the work cylinders are in proper sewing and trimming positions. Means are also provided to insure retention of the stitches of the work on the impaling pins or points of the work cylinders. These means consist of plate-like members 72 corresponding substantially in diameter to the inner diameter of the ring of points on the cylinders. These plates 72 are carried by arms 73 mounted on a post 74 slidable axially of the work cylinder turret. Post 74, together with the work hold-down plates 72, is elevated automatically each time the sewing and trimming operations have been completed so that the turret will be free to be revolved. This is accomplished by having the lower end of the slidable post secured to a lever 75 pivoted in the base and having an extension projecting into the path of a trip 76 carried by a trip disk 77 on timer shaft 52. This trip operates in proper sequence with relation to the automatic stopping and starting of the machine so as to elevate the hold-down plates 72 out of the ring of impaling pins each time the sewing operation is completed preparatory to revolving the work turret.

The hold-down plates are carried on screw threaded posts 78 projecting through radially extending slots 79 in the arms on the slidable post. These threaded posts 78 carry suitable nuts 80 for locking them in any position in which they might be adjusted radially of the arms.

The trimmer mechanism heretofore mentioned is slidable toward and from the turret. For instance, it may be mounted on a slidable member 81 in ways formed on an extension or arm 82 projecting from the hub of the turret support extension 37. The trimmer mechanism is thus slidably mounted in order that it may be periodically moved into and out of the position in which it engages work on a work cylinder in trimming position. Sliding movement is imparted to the trimmer mechanism by means of a bell crank lever 83 pivoted at 84 and having one arm connected to the plate 81 by a link and having its other arm connected by an adjustable connecting rod 85 to a lever 86 pivoted on the shaft 29. Lever 86 carries a cam roller 87 which engages in a cam-way 88 in the trip disk 59, the camming surface in said cam-way being such that by rocking the lever the trimmer mechanism plate may be reciprocated back and forth in its ways, tangentially of the perimeter of the turret. It will be understood that the cam operates, in proper timed sequence with respect to the movements of the sewing mechanism, hold-down plates, etc., and shifts the trimming mechanism out of trimming position before the work cylinder turret is to be revolved to transfer the several work cylinders to new positions.

Attention is called to the fact that the trips on the trip disks are each adjustable in groove 89 circumferentially of said disks. In this way the camming surface for actuating the trimmer mechanism can be taken as the determining factor, so to speak, and the trips on the other disks adjusted circumferentially in their grooves to points where the hold-down plates will be elevated; the feed dog for the sewing mechanism rendered inoperative; the clutch disengaged and the plate carrying the sewing mechanism retracted, all in proper sequence with respect to one another and with respect to the shifting of the trimmer. That is, the trips will be adjusted in the trip disks so that the sewing mechanism will first be withdrawn radially from the work cylinder; the posts carrying the hold-down plates elevated and the trimmer mechanism moved to inoperative position; and finally the feed dog will be withdrawn from the teeth on the cylinder in sewing position and the sewing mechanism rendered inoperative by the clutch for the main driving shaft being disengaged.

The trimmer mechanism (Figs. 1 and 17 to 26) comprises a pedestal 90 projecting upward from plate 81 and journaled in said pedestal is a shaft 91 which carries two cams 92, 93. Cam 92 engages one arm of a bell crank lever 131, and on the other arm of said lever there is pivoted a feed dog 94 yieldingly urged toward the teeth 40 of a work cylinder in trimming position, by a spring 132, whereby rocking movement of said bell crank lever by the cam will rotate said cylinder one step each revolution of the trimmer shaft. Lever 131 is yieldingly retracted by spring 95, but in order to regulate the throw of the dog, the retractive movement may be limited by a stop 96 adjustably secured on pedestal 90. The other cam 93 is connected by a rod 97 to a lever 98 pivoted at one end on the pedestal. The other end of said lever carries a trimmer knife 99, whereby oscillation of the lever reciprocates said knife past the cutting edge of a fixed knife 100 mounted on the pedestal. For the purpose of guiding the selvedge band into proper position with respect to the knives 99 and 100 which operate in scissors fashion, there is provided a selvedge guide plate or finger 115 which closely underlies the selvedge, guiding it upwardly and outwardly and preventing it from slipping between the knives and the work cylinder. In this connection it should be brought out that at the beginning of the trimming operation the trimmer mechanism and its blades 99 and 100 are disposed in spaced relation with respect to the work cylinder. Upon advance of the trimmer into proximity with the work cylinder by means of cam-way 88 in trip disk 59, cam roller 87, lever 86, connecting rod 85 and bell crank lever 83, knives 99 and 100 cut diagonally through the selvedge and, as the work cylinder rotates, trim the thus split selvedge from the work proper, while brush 103 clears the selvedge portions as trimmed and urges them down chute 116.

Journaled in an arm 101 pivoted on pedestal 90 is a short rocker shaft 102 on which is mounted the brush 103 and on which there is provided a crank 107. Arm 101 is adjustable toward and from a work cylinder, in trimming position, by a screw 104 attached to said arm and extending through an orifice is a bracket 105 on the pedestal. A spring 106 is preferably placed around screw 104 between the bracket and arm 101. The crank 107 of crank shaft 102 is connected by a pitman 108 to a crank 109 on a shaft 110 connected by gears 111 to the trimmer shaft to impart oscillatory motion to the shaft brush. In view of the fact that the brush engages work on a cylinder some little distance from the point at which the knives engage the work, the cylinders, when being trimmed, are rotated at a higher rate of speed than those in sewing position. This is preferably accomplished by providing gears 112, 113 (Fig. 27) of different sizes for driving the trimmer mechanism, the larger gear 112 being mounted on the main drive shaft and the smaller gear 113 meshing with gear 112, being mounted on a flexible drive connection 114 attached to the trimmer shaft. The ratio of the two gears 112, 113, is such that between the time the trimmer mechanism moves into trimming position (or when the sewing mechanism is rendered operative) and the time the trimmer mechanism moves out of trimming position (or when the sewing mechanism is rendered inoperative) a cylinder in trimming position will have made a complete revolution plus the distance between the trimmer knives and the brush. This insures that the entire selvedge band is severed and brushed from the boot and top portions proper. The "trimmings" or selvedge scraps are conveyed away from the trimming mechanism through the chute 116.

To sever the sewing thread, a cutter or knife 117 is pivoted on a bracket 118 on the arm 73, which carries the hold down plate that cooperates with the work cylinder in sewing position. Knife 117 is yieldingly urged toward the work cylinder by a spring 119. During the sewing operation, this knife is positioned below the bases of the work points 40, but when post 74 is raised to elevate the hold-down plates, the knife is also elevated to a position where it will engage and sever the chaining-off stitches as the turret is revolved clockwise to bring the next piece of work to sewing position.

It will be noted the face of trip 60 which engages lever 62 is somewhat elongated for the purpose of holding plate 12 retracted for the desired interval of time. Assuming that trip 60 is about to move out of contact; that cam surface 88 is about to move the trimmer mechanism to trimming position; that the drive shaft is disconnected; and that work cylinders are in sewing and trimming positions, a cycle of operations will now be described. Operating lever 21 is rocked horizontally (Fig. 7), with the result that the clutch elements are operatively associated through bell crank lever 20 and the clutch shifting member 17. At the same time, the lever 20 is engaged and retained in clutch engaging position by latch lever 25. This renders the sewing mechanism operative and moves said mechanism, as well as the trimmer mechanism, to their work engaging positions, the advance of the plate 12 being limited by the stop 128. The hold-down plates 72 are also in work engaging position at this time. The work on the cylinder in trimming position is trimmed and brushed as before described and upon completion, the trimmer is moved away from the turret by cam roller 87 riding up on the high portion of cam surface 88. As the trimmer is moving away, the plate 12 is also retracted by trip 60 engaging lever 62. At the time plate 12 begins to move away from the turret the seam in the work will have been completed, with the ends of the seam overlapped. During the retraction of plate 12, the chaining-off stitches are formed by the sewing mechanism. Next, trip 76 engages lever 75, raising the hold-down plates 72 and the knife 117, the latter then being in position to engage the chaining-off stitches. Up to this time, the feed dog of the sewing mechanism has remained in engagement with the work cylinder teeth. The next movement, therefore, is the rocking of lever 49 by trip 57, to disengage said dog. Immediately after this, trip 54 engages and rocks lever 27 and the latter, through rod 26, rocks latch lever 25. This frees bell crank lever 20 so that under the tension of spring 22 attached to operating lever 21, the cam roller 19 rides on the high portion of cam surface 18 and retracts the clutch shifting member 17 and disengages the clutch. This renders the main drive shaft, and parts actuated therefrom, inoperative. The pin or plunger 70 (Fig. 3), is then retracted by the attendant and the turret moved clockwise for one-third of a revolution. New work on a cylinder at station "C" (Fig. 1) will thus be moved to trimming position "B", and the previously trimmed work will likewise be moved to sewing position "A". Also, previously sewn work will be moved to station "C". The attendant then again places the machine in operation by rocking the operating lever 21 horizontally, and, while the machine is in operation, removes the previously finished work from station "C" and replaces it with new work. If, for any reason, the attendant wishes to disengage the clutch while the machine is running it is only necessary to rock the operating lever 21 vertically. This depresses latch lever 25 and releases the bell crank lever 20.

It will be apparent to those skilled in the art that numerous changes may be made in the disclosed embodiment of my invention without departing from the essential concepts of my invention. Likewise, certain inventive features herein described and disclosed are applicable to machines of other types and purposes. I therefore claim my invention broadly as indicated by the appended claims.

What I claim is:

1. In a sewing machine of the type described, a base, a work support for holding the work to be sewn, and a sewing mechanism automatically retractive from the work when the sewing operation has been completed, said sewing mechanism comprising a slidable bed plate, a main shaft journaled on said plate, stitching mechanism driven by said shaft, a cam shaft journaled on said plate and driven by said main shaft in fixed ratio therewith, one turn of said cam shaft representing one complete sewing cycle, a cam on said cam-shaft, and an abutment mounted upon said base and against which said cam bears forcing said bed plate into retracted position with respect to the work when the stitching mechanism has completed its operation thereon.

2. In a sewing machine of the type described, a base, a work support for holding the work to be sewn, and a sewing mechanism automatically retractive from the work when the sewing operation has been completed, said sewing mechanism comprising a slidable bed plate, a main shaft journaled on said plate, stitching mechanism driven by said shaft, a cam shaft journaled on said plate, and driven by said main shaft in fixed ratio therewith, one turn of said cam shaft representing one complete sewing cycle, a cam on said cam shaft, an abutment mounted upon said base and against which said cam bears forcing said bed plate into retracted position with respect to the work when the stitching mechanism has completed its operation thereon, a clutch on said main shaft which imparts the drive thereto, and a second cam on said cam shaft which effects disengagement of said clutch and stoppage of the main shaft, said last mentioned cam being timed for effecting disengagement of said clutch only after the first cam has effected retraction of the stitching mechanism from the work.

3. In a sewing machine of the type described, a base, a rotatable work cylinder mounted upon said base, said work cylinder having a plurality of work impaling pins, a member snugly receivable within the work cylinder for holding down the work impaled upon said pins during the sewing of said work, a bed plate slidably mounted upon said base, a main shaft journaled on said plate, stitching mechanism driven by said shaft, a cam shaft journaled on said plate and driven by said main shaft in fixed ratio therewith, one turn of said cam shaft representing one complete sewing cycle, a cam on said cam shaft engaging an abutment on said base and effecting retraction of said bed plate when the stitching mechanism has completed its operation upon the work, a second cam on said cam shaft which subsequently moves the work depressing member clear of said work cylinder, a clutch on said main shaft which imparts the drive thereto, and a third cam on said cam shaft which effects disengagement of said clutch and stoppage of the main shaft, said last mentioned cam being timed for effecting disengagement of said clutch only after the first two cams have cleared the work depressing plate and bed plate from the work cylinder.

4. In a sewing machine of the class described, a base, a work cylinder rotatably mounted upon said base, said work cylinder having a plurality of work impaling pins, a bed plate slidably mounted upon said base, a main shaft journaled on said plate, stitching mechanism driven by said shaft, a feed dog engaged with teeth on said work cylinder and driven by said shaft, a cam shaft journaled on said plate and driven by said main shaft in fixed ratio therewith, one turn of said cam shaft representing one complete sewing cycle, a cam on said cam shaft engaging an abutment on said base and effecting retraction of said bed plate when the stitching mechanism has completed its operation upon the work, a second cam on said cam shaft which moves said feed dog out of engagement with the teeth of said work cylinder, a clutch on said main shaft which imparts the drive thereto, and a third cam on said cam shaft which effects disengagement of said clutch and stoppage of the main shaft.

5. In a sewing machine of the type described, a work cylinder having a plurality of impaling pins carried thereby upon which the loops of knitted work to be sewn are carried, a stitching mechanism, and an adjustable cylinder rotating mechanism comprising teeth on said cylinder, a pawl engaging said teeth for imparting a step by step rotation to said cylinder, a collar member attached to said pawl, a reciprocating rod driven with said stitching mechanism and extending loosely through said collar, and driving abutments on said rod at each side of said collar engageable therewith and adjustable with respect to said collar which abutments determine the extent of movement imparted thereto.

6. In a sewing machine of the type described, a work cylinder having a plurality of impaling pins carried thereby upon which the loops of knitted work to be sewn are carried, a stitching mechanism, and an adjustable cylinder rotating mechanism comprising teeth on said cylinder, a pawl engaging said teeth for imparting a step by step rotation to said cylinder, a collar member attached to said pawl, a reciprocating rod driven with said stitching mechanism and extending loosely through said collar, said rod terminating in a conical driving head which abuts and imparts motion to said collar on the pulling stroke of said rod, and a driving abutment on said rod which abuts said collar and imparts motion thereto on the return stroke, said abutment being adjustable with respect to said conical head and the means which drives the rod.

7. In a sewing machine of the type described, a base, a stitching mechanism supported upon said base, a work supporting turret rotatably mounted upon said base, means for rotatably supporting a plurality of work cylinders on said turret, each cylinder comprising work impaling pins, means for selectively holding said turret against rotation in any of several positions in each of which a work cylinder will be accurately positioned for sewing to be effected by said stitching mechanism, a member slidably supported in said turret and snugly receivable within the work cylinder in sewing position for holding down the work impaled upon said pins, and means for moving said member clear of said work cylinder so that the turret may be rotated.

8. In a sewing machine of the type described, a base, a stitching mechanism supported upon said base, a work supporting turret rotatably mounted upon said base, means for rotatably supporting a plurality of work cylinders on said turret, each cylinder having work impaling pins, means for selectively holding said turret against rotation in any of several positions in each of which a work cylinder is accurately positioned for sewing to be effected by said stitching mechanism, a member slidably supported in said turret and snugly receivable within the work cylinder in sewing position for holding down the work impaled upon said pins during the stitching operation, and means driven with the stitching mechanism for moving said member clear of said cylinder when the work impaled thereon has been sewn so that the turret may be rotated.

9. In a sewing machine of the type described, a base, a stitching mechanism, a rotatable work supporting turret on said base, means on said turret for rotatably supporting a work cylinder, said work cylinder having a series of impaling pins mounted thereon, a work depressing member slidably secured in said turret and snugly receivable within the work cylinder when the latter is in operative association with the stitching mechanism, a knife mounted on the work depressing member and means for raising said depressing member clear of the work impaling pins on said cylinder so that the turret may be rotated, the upward movement of said depressing member moving the edge of said knife in proximity with the stitches formed by the sewing mechanism.

10. In a sewing machine of the type described, a base, a work supporting turret rotatably mounted upon said base, means for supporting a plurality of work cylinders on said turret, a sewing mechanism, a trimming mechanism, means for selectively holding said turret against rotation in any of several positions in each of which one cylinder will be accurately positioned for the trimming of selvedge or the like and another cylinder will be accurately positioned for sewing to be accomplished upon the work, and means for rotating a cylinder in sewing position at one speed and rotating a cylinder in trimming position at a speed in excess of that at which the cylinder in sewing position is rotated.

11. In a sewing machine of the type described, a base, a stitching mechanism supported upon said base, a turret rotatably mounted upon said base and adapted to rotatably support a plurality of work cylinders, each of said cylinders having a circular series of work impaling pins thereon, a two-armed standard slidably mounted within the bearing of said turret, the arms of which standard extend radially of said turret, a circular disc receivable within the series of pins of each of the cylinders for preventing work impaled thereon from slipping from said pins, means for adjustably securing said discs to their respective arms of said standard, and means for sliding said standard in said turret to cause said discs to clear their respective cylinders.

12. In a sewing machine of the type described, the combination of a base, an abutment on the base, a rotatable work cylinder, a plate slidable on said base, a sewing mechanism on said plate, a drive shaft on said plate, operating connections between said drive shaft and sewing mechanism, means for rotating said work cylinder, and means operable by said shaft for sliding said plate away from said work cylinder, said last mentioned means comprising a lever pivoted on the plate and engaging against said abutment, and means on said shaft for rocking said lever.

13. In a sewing machine of the type described, the combination of a base, a rotatable work cylinder, a plate slidable on said base, a drive shaft on said plate, a sewing mechanism, operating connections between said shaft and sewing mechanism, means operable from said shaft for controlling the operation of the sewing mechanism, means for rotating said work cylinder, an abutment on said base, a lever pivoted on said plate and means for rocking said lever to move said plate relatively to the work cylinder.

THOMAS H. DE SPAIN.